(12) United States Patent
Mansell et al.

(10) Patent No.: US 8,140,820 B2
(45) Date of Patent: Mar. 20, 2012

(54) DATA PROCESSING APPARATUS AND METHOD FOR HANDLING ADDRESS TRANSLATION FOR ACCESS REQUESTS ISSUED BY PROCESSING CIRCUITRY

(75) Inventors: David Hennah Mansell, Waterbeach (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 694 days.

(21) Appl. No.: 12/153,617

(22) Filed: May 21, 2008

(65) Prior Publication Data

US 2009/0292899 A1 Nov. 26, 2009

(51) Int. Cl.
*G06F 12/10* (2006.01)
(52) U.S. Cl. ........ 711/202; 711/205; 711/206; 711/207; 711/E12.059; 711/133
(58) Field of Classification Search .......................... None
See application file for complete search history.

(56) References Cited

U.S. PATENT DOCUMENTS 7,171,539 B2   1/2007  Mansell et al.
7,428,626 B2 *  9/2008  Vega ............................. 711/203
2006/0026564 A1 *  2/2006  Cabillic ........................ 717/118

\* cited by examiner

*Primary Examiner* — Reginald Bragdon
*Assistant Examiner* — Baboucarr Faal
(74) *Attorney, Agent, or Firm* — Nixon & Vanderhye P.C.

(57) ABSTRACT

A data processing apparatus has address translation circuitry which is responsive to an access request specifying a virtual address, to perform a multi-stage address translation process to produce, via at least one intermediate address, a physical address in memory corresponding to the virtual address. The address translation circuitry references a storage unit, with each entry of the storage unit storing address translation information for one or more virtual addresses. Each entry has a field indicating whether the address translation information is consolidated address translation information or partial address translation information. If when processing an access request, it is determined that the relevant entry in the storage unit provides consolidated address translation information, the address translation circuitry produces a physical address directly from the consolidated address translation information. If on the other hand the relevant entry stores partial address translation information, the address translation circuitry produces an intermediate address from the partial address translation information and then performs the remainder of the multi-stage address translation process. Such an approach provides the performance benefits associated with a consolidated entry mechanism within the storage unit, while also allowing certain problem cases to be handled correctly and in an efficient manner.

18 Claims, 7 Drawing Sheets

|  | ACCESS PERMISSION FROM 1ST STAGE DESCRIPTOR | | | |
|---|---|---|---|---|
|  | NO ACCESS | READ ONLY | WRITE ONLY | READ/WRITE |
| NO ACCESS | O.K. | R→2ND STAGE P.F W→1ST STAGE P.F ✗ | W→2ND STAGE P.F R→1ST STAGE P.F ✗ | W OR R→2ND STAGE P.F ✗ |
| READ ONLY | O.K. | O.K. | W→2ND STAGE P.F R→1ST STAGE P.F ✗ | W→2ND STAGE P.F R→DO 2ND STAGE WALK ? |
| WRITE ONLY | O.K. | R→2ND STAGE P.F W→1ST STAGE P.F ✗ | O.K. | R→2ND STAGE P.F W→DO 2ND STAGE WALK ? |
| READ/WRITE | O.K. | O.K. | O.K. | O.K. |

ACCESS PERMISSION FROM 2ND STAGE DESCRIPTOR

O.K. = NEVER SECOND STAGE PERMISSION FAILURE

✗ = NEVER HAVE TO DO 2ND STAGE PAGE TABLE WALK

? = DO 2ND STAGE PAGE TABLE WALK

FIG. 7

DATA PROCESSING APPARATUS AND METHOD FOR HANDLING ADDRESS TRANSLATION FOR ACCESS REQUESTS ISSUED BY PROCESSING CIRCUITRY

OVERVIEW

The technology described in this application relates to a data processing apparatus and method for handling address translation for access requests issued by processing circuitry.

BACKGROUND

Processing circuitry within a data processing apparatus will typically have access to memory in which data required to run any particular application on the processing circuitry will typically be stored. It will be appreciated that the data may consist of the instructions contained within the application and/or the actual data values used during execution of those instructions on the processing circuitry.

When the processing circuitry needs to access data in the memory, the processing circuitry issues an access request specifying an address for that data. Often, the access request will specify a virtual address, and address translation circuitry will be used to perform an address translation process in order to produce a physical address in the memory corresponding to the specified virtual address.

In certain data processing systems, it is known for the address translation process to be performed as a multi-stage process. In one example, a two stage address translation process can be performed, a first stage of the address translation process converting the virtual address to an intermediate address, and a second stage of the process then causing the intermediate address to be translated to a corresponding physical address. One such system is described in commonly owned U.S. Pat. No. 7,171,539, the entire contents of which are hereby incorporated by reference. The data processing apparatus described therein aims to provide hardware enforced security, the data processing apparatus being operable in either a secure domain or a non-secure domain, and different address translations from virtual to physical address being required dependent on the domain in which the data processing apparatus is operating. As described in the patent, in such a system a two stage address translation can be performed, with the second stage of the address translation being managed from the secure domain, and in particular allowing secure memory regions to be completely hidden from the non-secure operating system's view of its physical address space.

However, the use of a multi-stage address translation process is not only useful in data processing systems employing such hardware enforced security techniques, but instead can be used in a variety of other situations. One such example is a data processing system employing virtualisation techniques.

In a typical virtualisation environment, a processing device such as a processor core is arranged to execute hypervisor software which supports the execution of multiple virtual machines on that processing device. Each virtual machine will have one or more applications running on a particular operating system, with the hypervisor software acting as an interface layer between the virtual machine and the underlying hardware to enable the provision of appropriate hardware support to the virtual machine. Via the hypervisor software layer, each virtual machine gets a particular view of the system in which it resides, and thus gets a particular view of the available hardware resources of the system. Each virtual machine operates independently of other virtual machines on the system, and indeed is not necessarily aware of the presence of the other virtual machines.

Accordingly, in an example system, one virtual machine may be executed which runs a particular operating system, for example Microsoft Windows, whilst another virtual machine may be executed running a different operating system, for example Linux.

In such a virtualised system, multiple stages of address translation can be used. In particular, in one example, a first stage of address translation may be controlled by the particular operating system running inside a virtual machine in order to map a specified virtual address to an intermediate address, and then a second stage of address translation can be controlled by the hypervisor software in order to map the intermediate address to a physical address in memory. By ensuring that the hypervisor software manages the second stage of the address translation, then the hypervisor software can ensure the separation of the various virtual machines executing on the processing circuitry.

When performing a multi-stage address translation process, the circuitry performing that address translation will typically need to access a number of page tables provided within memory in order to determine the required translation, and to resolve access permission rights and determine region attributes. In particular, a separate page table will typically be accessed for each stage of the address translation, and hence in the above particular example a first page table managed by the virtual machine's operating system will be accessed during the first stage of the address translation to determine the required virtual to intermediate address translation, and then a second stage page table managed by the hypervisor software will be accessed during the second stage of the address translation in order to determine the required intermediate to physical address translation.

Each page table typically contains a plurality of descriptors, each descriptor providing, for a particular region of memory, address mapping information, access permissions rights, region attributes, the size of the memory region to which the descriptor relates, and any other required information. Indeed, often page tables are nested to form a multi-level structure, so that certain entries in the page table will actually point to a lower level page table providing descriptors for various regions of memory, rather than the descriptors being provided directly in the top level page table.

Since significant time can be expended in accessing the page tables, it is known to provide one or more translation lookaside buffers (TLBs) locally in association with the circuitry that performs the address translation (for example a memory management unit (MMU)), in which information retrieved from the page tables can be stored locally to improve performance when processing subsequent access requests. However, when adopting a multi-stage address translation process, it has previously been necessary to provide separate TLB structures for each stage of the address translation. Hence, by way of example, the virtual address specified by the access request can be used to perform a lookup in a first TLB structure, and if a hit is detected this will enable generation of an intermediate address from the relevant information stored in that TLB structure. Then, using the intermediate address, a lookup can be performed in a second TLB structure having entries specifying intermediate to physical address translations, and again if a hit is detected the physical address can be determined from the information stored in that second TLB structure.

Nevertheless, it will be appreciated that even if hits are detected in the various TLB structures, the need to perform lookups in multiple TLB structures can significantly impact performance when handling access requests. For example, considering the earlier virtualisation system, it is not efficient when the virtual machine is running to pass the address of every memory access request through at least two TLB structures in order to resolve the physical address, and instead it would be useful to provide a single TLB containing "consolidated" entries which enable a direct translation from virtual address to physical address using information derived from both sets of page tables. If such a consolidated TLB structure is used, this would mean that the overhead of having the two sets of pages tables would only be exposed on a TLB miss, thereby increasing performance in the common cases where a hit is detected in the TLB.

A known virtualisation technique uses "shadow page tables", in which consolidated entries are made in the TLB. Considering the earlier mentioned two stage address translation, then when employing a shadow page table technique, a third set of tables is provided, containing consolidated virtual address to physical address translations, and when the virtual machine is running the MMU is pointed at these tables. Initially these tables are blank (i.e. every address causes a fault). When a fault occurs, the hypervisor reads the virtual address to intermediate address tables and the intermediate address to physical address tables, computes the virtual address to physical address translation, and adds an entry to the shadow page table. The hypervisor must also intercept all TLB maintenance operations issued from the virtual machine to keep the shadow page tables accurate. One disadvantage arising from the use of such shadow page tables is the increase in overhead resulting from maintaining the shadow page tables.

Further, certain problems can arise when using a consolidated TLB. Firstly, as mentioned earlier, each descriptor in a page table typically includes a field identifying the size of the memory region to which that descriptor relates. Considering the earlier-mentioned two stage address translation process, both stages of translation may involve referencing descriptors associated with a variety of different sizes of memory region, for example 4K pages and 2 Mb sections. Considering the earlier virtualisation example, if the virtual machine's operating system has chosen to use a 2 Mb section in an area of intermediate address space which the hypervisor software has mapped into 4K pages, then any consolidated TLB entry must be 4K in size, i.e. to match the size specified by the second stage page table. This can cause significant problems if the address translation for certain regions of memory later needs to be invalidated. For example, if the virtual machine's operating system later attempts to invalidate the section entry in the TLB (for example because it has changed, or is removed), it is very difficult for a consolidated TLB to handle this correctly. In particular, the TLB invalidate operation does not necessarily specify a size, so in order to guarantee correct operation, the TLB would have to search for all 512 possible 4K entries within the 2 Mb section required to be invalidated, which would be very inefficient. It is also very difficult to do this search conditionally since there is no guarantee that any particular entry among the 512 possible will actually be present within the TLB to act as a marker. Furthermore, since there could be many different valid page sizes in a particular working system, there is potentially a very large amount of searching needed. This problem will be referred to herein as the "larger page on top of small page" problem, since it occurs whenever a memory region size associated with the relevant descriptor in the page table for an earlier stage of the multistage address translation process is larger than a memory region size associated with the relevant descriptor in the page table for a later stage of the multi-stage address translation process.

As another example of a problem that can occur when using a consolidated TLB, both stages of address translation allow for access control information to be specified, for example access permissions rights. In particular, within the descriptors of each page table, access permission rights may specify whether an access to the corresponding region of memory is only allowed for a read operation, is only allowed for a write operation, is allowed for both read and write operations, or is not allowed at all. If the relevant descriptor accessed for the first stage of the address translation, namely the virtual to intermediate address translation indicates that the access is allowed, but the descriptor used for the second stage of the address translation, namely the intermediate to the physical address translation, indicates the access is not allowed, the fault must be reported to the entity in charge of the second stage of the address translation, for example the hypervisor software in the earlier mentioned virtualisation example. When reporting the fault, it will also be necessary to provide the intermediate address, since the hypervisor will not know, or indeed even care about, virtual addresses. In a consolidated TLB storing only physical addresses, it would be difficult to produce the intermediate address in such circumstances. Further, if an intermediate address were added to every entry merely to provide for such situations, this would be very inefficient since that intermediate address will not be needed most of the time. This problem will be referred to herein as the "later stage permission" problem, since it occurs whenever the access permission information associated with the relevant descriptor in the page table for an earlier stage of the multi-stage address translation process is more permissive than the access permission information associated with the relevant descriptor in the page table for a later stage of the multi-stage address translation process.

It is expected that the majority of entries within a consolidated TLB would be "well behaved" entries, which in the context of the above discussion of problem cases can be interpreted as an entry where the memory region size associated with a later stage of the address translation is the same size or larger than the memory region size associated with an earlier stage of the address translation (thereby ensuring that any TLB invalidate operation, as for example may be performed by the virtual machine's operating system in the above virtualisation example, will work as expected without further searching being required), and also the access permission rights of a later address translation stage are at least as "permissive" as the access permission rights of an earlier address translation stage (thereby ensuring that a later stage permission fault cannot occur).

Nevertheless, whilst the above discussed problem cases are expected to be comparatively rare, they are still likely to occur occasionally during the operation of the processing circuitry, particularly where legacy software is used. For example, in a virtualisation environment, it will typically be required to support unmodified legacy operating systems, and it is hence not an option to change the software to avoid such problem cases occurring.

Accordingly, it would be desirable to provide an efficient address translation mechanism in systems employing a multistage address translation process, whilst also ensuring correct handling of the problem cases discussed earlier.

SUMMARY OF THE INVENTION

A data processing apparatus comprises: processing circuitry for performing data processing operations; a memory system for storing data for access by the processing circuitry when performing said data processing operations; address translation circuitry, responsive to an access request issued by the processing circuitry and specifying a virtual address, to perform a multi-stage address translation process to produce, via at least one intermediate address, a physical address in said memory system corresponding to the virtual address; a storage unit accessible by the address translation circuitry and having a plurality of entries, each entry storing address translation information for one or more virtual addresses, and each entry having a field which indicates whether the address translation information is consolidated address translation information enabling the address translation circuitry to generate the physical address, or is partial address translation information enabling the address translation circuitry to generate one of said at least one intermediate addresses; responsive to the access request issued by the processing circuitry, the address translation circuitry referencing the storage unit to determine whether one of said entries provides address translation information for the specified virtual address; if said one of said entries provides address translation information for the specified virtual address, and the field indicates that the address translation information is consolidated address translation information, the address translation circuitry producing the physical address directly from the consolidated address translation information; and if said one of said entries provides address translation information for the specified virtual address, and the field indicates that the address translation information is partial address translation information, the address translation circuitry producing said one of said at least one intermediate addresses from the partial address translation information before performing the remainder of the multi-stage address translation process.

A storage unit (for example a TLB) accessible by the address translation circuitry includes in association with each of its entries a field which indicates whether the address translation information in that entry is consolidated address translation information or partial address translation information. On receipt of an access request, a lookup is performed in the storage unit in the standard manner. If, for a hit entry of the storage unit, the field indicates that the address translation information is consolidated address translation information, the address translation circuitry then produces the physical address directly from the consolidated address translation information. However, if for a hit entry the field indicates that the address translation information is partial address translation information, the address translation circuitry produces the intermediate address from the partial address translation information and then performs the remainder of the multi-stage address translation process, for example with reference to any required page table(s) in the memory system.

Consolidated entries can be provided within the storage unit to improve efficiency of the address translation for multi-stage address translation processes, whilst still enabling correct handling of the address translation for certain problem cases in an efficient manner. For example, considering the earlier "larger page on top of small page" problem, then in this instance partial address translation information can be stored within the relevant storage unit entry, with the field being set appropriately. When a hit occurs in such an entry, it will be necessary to perform the remainder of the multi-stage address translation process in order to determine the physical address. However, since the single entry in the TLB will relate to the larger (earlier stage) mapping, any attempt to invalidate it will proceed as expected without the need for any additional lookups.

As another example, considering the earlier "later stage permission" problem, then again partial address translation information is stored within the relevant entry, and when a hit is detected in such an entry, then the remainder of the multi-stage address translation process will need to be performed using the intermediate address derived from the partial address translation information. If a permission failure occurs during the remainder of the multi-stage address translation process, then the intermediate address is directly available from the partial address translation information stored in the entry of the storage unit, thereby enabling correct handling of this situation.

Accordingly, the optimal performance of "well behaved" entries is maintained, whilst allowing problem cases to handled in a straightforward and efficient manner.

There are a number of ways in which the entries of the storage unit can be populated with address translation information. In one embodiment, the data processing apparatus further comprises control circuitry for populating an entry in the storage unit with address translation information, the control circuitry when producing the address translation information checking if one or more predetermined conditions exist. If said one or more predetermined conditions exist, the control circuitry produces said partial address translation information and sets the field to identify a stage of the multi-stage address translation process that will be reached by the address translation circuitry when using the partial address translation information. If on the other hand said one or more predetermined conditions do not exist, the control circuitry produces said consolidated address translation information and sets the field to indicate that the address translation information is consolidated address translation information.

In the general case of a multi-stage address translation process, where the physical address is derived from the virtual address by one or more intermediate addresses, then on occurrence of one of the predetermined conditions, the control circuitry will produce partial address translation information and set the field to identify the stage of the multi-stage address translation process that will be reached when using that partial address translation information. For example, considering a three stage process where the virtual address is translated to a first intermediate address, the first intermediate address is translated to a second intermediate address, and the second intermediate address is then translated to a physical address, then if the partial address translation information enables the second intermediate address to be determined, the field will identify that the second stage of the three stage address translation process will be reached.

In one embodiment the field may be implemented by a flag identifying whether the address translation information is consolidated address translation information or partial address translation information, along with a stage indicating value which, for partial address translation information, identifies the stage of the multi-stage address translation process that will be reached when using that partial address translation information. However, considering the earlier mentioned example of a two stage address translation process where the virtual address is translated to an intermediate address and the intermediate address is then translated to the physical address, it will be appreciated that whenever partial address translation information is stored and the field is set, this will implicitly identify that the first stage will be reached when using the partial address translation information, and hence there is no need for a stage indicating value to be provided within the field to explicitly identify the stage. Instead the field may be implemented purely by a flag having two valid states. Further, it will be appreciated that even in embodiments including more than two stages of address translation, if the partial address translation information is always constrained to relate to the same intermediate stage of address translation, then again a simple flag can be used to provide the required field.

The technique of example embodiments can be used in a variety of data processing systems where multi-stage address translation is required. In one embodiment, the processing circuitry executes hypervisor software to support the execution of multiple virtual machines on the processing circuitry, at least a final stage of the multi-stage address translation process employing address translation information controlled by the hypervisor software. By ensuring that the hypervisor software manages at least the final stage of the multi-stage address translation process, then the hypervisor software can ensure the separation of the various virtual machines executing on the processing circuitry. Considering the earlier example of a two stage address translation process, the first stage page table can be defined by software running on the virtual machine, and indeed the operating system of any particular virtual machine can provide separate first stage page tables for the different applications running on that virtual machine. However, by ensuring that the hypervisor software manages the second stage page table controlling the intermediate to physical address translation, then the hypervisor software can ensure the separation of the various virtual machines. In one embodiment a second stage page table may be provided for each virtual machine.

In one embodiment, for each stage of the multi-stage address translation process a page table is provided in said memory system, each page table containing a number of descriptors, each descriptor containing, for an associated address range, address translation information and access control information for the associated stage.

In one embodiment, if a particular entry of the storage unit only stores partial address translation information, then the entry will be arranged to only store the access control information relevant to that partial address translation information. However, in some embodiments, it will be beneficial if in such situations, the entry further stores the access control information for each stage of the multi-stage address translation process. It has been found that by such an approach, this can reduce the number of instances in which further page table accesses are required in order to perform the remainder of the multi-stage address translation process. In particular, through the storage of the access control information for each stage of the multi-stage address translation process, it may be possible to detect situations where an access permission fault will be generated, and accordingly there is no need to perform any further page table walk. Since on detection of such an access permission fault, the partial address translation information is directly available from the relevant entry of the storage unit, all the information required for reporting the fault is immediately available, thereby improving the efficiency of handling of such fault conditions.

In one embodiment, one of the one or more predetermined conditions checked by the control circuitry is whether an address range associated with the relevant descriptor in the page table for an earlier stage of the multi-stage address translation process is larger than an address range associated with the relevant descriptor in the page table for a later stage of the multi-stage address translation process. Accordingly, one of the conditions checked for by the control circuitry is the earlier-mentioned "larger page on top of small page" problem, and on the detection of that situation, the relevant entry in the storage unit is populated with partial address translation information, with the field being set appropriately.

In one embodiment, one of said one or more predetermined conditions checked by the control circuitry is whether the access control information associated with the relevant descriptor in the page table for an earlier stage of the multi-stage address translation process is more permissive than the access control information associated with the relevant descriptor in the page table for a later stage of the multi-stage address translation process. Accordingly, in such embodiments, one of the conditions checked for by the control circuitry is the earlier-mentioned "later stage permission" problem, and on detection of such a situation, the relevant entry of the storage unit is populated with partial address translation information, with the field being set appropriately.

Whilst the technology described in this application is applicable to any multi-stage address translation process, in one particular embodiment the multi-stage address translation process is a two stage process, a first stage causing the specified virtual address to be translated to a corresponding intermediate address, and a second stage causing the corresponding intermediate address to be translated to a corresponding physical address.

In such embodiments, if the relevant entry of the storage unit stores consolidated address translation information, that consolidated address translation information allows the address generation circuitry to directly generate the corresponding physical address from the specified virtual address, and if the relevant entry of the storage unit stores partial address translation information, that partial address translation information allows the address generation circuitry to generate the corresponding intermediate address from the specified virtual address.

In one such embodiment, for both stages of the two-stage address translation process a page table is provided in said memory system, each page table containing a number of descriptors. Within a first page table each descriptor contains, for an associated virtual address range, address translation information and access control information for the first stage, and within a second page table each descriptor contains, for an associated intermediate address range, address translation information and access control information for the second stage. If the relevant entry of the storage unit stores partial address translation information, the address translation circuitry uses the partial address translation information to generate the corresponding intermediate address from the specified virtual address, and then references the second page table to complete the two-stage address translation process.

The storage unit may take a variety of forms, but in one embodiment the storage unit is a translation lookaside buffer (TLB).

In one embodiment, the data processing apparatus further comprises a micro-TLB for storing address translation information used by the address translation circuitry for a number of previous access requests, and the address translation circuitry is arranged on receipt of said access request to only reference the TLB if the required address translation information is not present in the micro-TLB. Hence, in such embodiments, the micro-TLB is used before the main TLB to store the most recently accessed entries in a more easily accessible form than the main TLB. When allowing, in accordance with example embodiments, the entries of the main TLB to store either consolidated address translation information or partial address translation information, it is important to manage the entries in the micro-TLB carefully to ensure correct operation in all situations.

In one embodiment, whenever any entry in the TLB is invalidated, all address translation information in the entire micro-TLB is invalidated. In one particular embodiment the micro-TLB is arranged to only store consolidated address translation information. It should be noted that consolidated address translation information can be stored in the micro-TLB even in situations where the corresponding entry in the main TLB stores partial address translation information. Hence, by way of example, when the main TLB has stored partial address translation information due to the "larger page on top of small page" problem, the micro-TLB can be arranged to store a consolidated address translation information of the smaller page size. Since the entire micro-TLB is invalidated whenever any entry in the main TLB is invalidated, this avoids the possibility of the larger page on top of small page problem giving rise to invalidate problems in respect of the micro-TLB, and hence storing of the consolidated address information in the micro-TLB does not cause a problem.

In one embodiment where only consolidated entries are provided in the micro-TLB, those consolidated entries are arranged to also store access control information associated with each stage of the multi-stage address translation process. This allows most accesses that hit in the micro-TLB to be handled without reference to the main TLB, the main TLB only being needed if there is a miss in the micro-TLB, or if following a hit in the micro-TLB an intermediate address is required in order to process a fault condition detected based on the access control information.

In another embodiment, the micro-TLB is arranged to store both consolidated address translation information and partial address translation information, for any partial address translation information stored in the micro-TLB, the micro-TLB also storing access control information associated with each stage of the multi-stage address translation process. Accordingly, in such embodiments, the micro-TLB is also allowed to store partial address translation information, but in such instances the access control information associated with every stage of the multi-stage address translation process is provided within the micro-TLB. As a result, this enables detection of the "later stage permission" problem from the information held in the micro-TLB entries, since all of the required access control information is available when accessing the micro-TLB. As with the earlier mentioned embodiment, consolidated address translation information can be stored in the micro-TLB even in situations where the corresponding entry in the main TLB stores partial address translation information.

The control circuitry used to populate entries in the storage unit can take a variety of forms. However, in one embodiment, the control circuitry comprises page table access circuitry for determining the address translation information to be used to populate an entry of the storage unit by accessing page tables provided in said memory system, a page table being provided for each stage of the multi-stage address translation process.

In one embodiment, the page table access circuitry contains an additional storage unit for caching address translation information obtained from descriptors provided within at least the page table associated with a final stage of the multi-stage address translation process. This can significantly improve efficiency in a variety of situations. For example, considering the earlier-mentioned two stage address translation process, in many cases a large second stage mapping may underlie many smaller first stage mappings. Hence, by caching the larger second stage mapping separately in the additional storage unit, this allows faster resolving of virtual address to physical address translations, without the need each time to perform a page table walk to the second stage page table. Accordingly, by such an approach, the presence of the additional storage unit reduces the penalty of having to perform the second stage page table walk again for the earlier-mentioned "problem" cases.

A method of handling address translation for access requests issued by processing circuitry in order to access data in a memory system, comprises: responsive to an access request issued by the processing circuitry and specifying a virtual address, employing address translation circuitry to perform a multi-stage address translation process to produce, via at least one intermediate address, a physical address in said memory system corresponding to the virtual address; providing a storage unit accessible by the address translation circuitry and having a plurality of entries, each entry storing address translation information for one or more virtual addresses, and providing each entry with a field which indicates whether the address translation information is consolidated address translation information enabling the address translation circuitry to generate the physical address, or is partial address translation information enabling the address translation circuitry to generate one of said at least one intermediate addresses; responsive to the access request issued by the processing circuitry, the address translation circuitry performing the steps of: referencing the storage unit to determine whether one of said entries provides address translation information for the specified virtual address; if said one of said entries provides address translation information for the specified virtual address, and the field indicates that the address translation information is consolidated address translation information, producing the physical address directly from the consolidated address translation information; and if said one of said entries provides address translation information for the specified virtual address, and the field indicates that the address translation information is partial address translation information, producing said one of said at least one intermediate addresses from the partial address translation information before performing the remainder of the multi-stage address translation process.

Viewed from another aspect, a data processing apparatus comprises: processing means for performing data processing operations; memory means for storing data for access by the processing means when performing said data processing operations; address translation means, responsive to an access request issued by the processing means and specifying a virtual address, for performing a multi-stage address translation process to produce, via at least one intermediate address, a physical address in said memory means corresponding to the virtual address; a storage means accessible by the address translation means and having a plurality of entries, each entry for storing address translation information for one or more virtual addresses, and each entry having a field for indicating whether the address translation information is consolidated address translation information enabling the address translation circuitry to generate the physical address, or is partial address translation information enabling the address translation circuitry to generate one of said at least one intermediate addresses; responsive to the access request issued by the processing means, the address translation means for referencing the storage means to determine whether one of said entries provides address translation information for the specified virtual address; if said one of said entries provides address translation information for the specified virtual address, and the field indicates that the address translation information is consolidated address translation information, the address translation means for producing the physical address directly from the consolidated address translation information; and if said one of said entries provides address translation information for the specified virtual address, and the field indicates that the address translation information is partial address translation information, the address translation means for producing said one of said at least one intermediate addresses from the partial address translation information before performing the remainder of the multi-stage address translation process.

BRIEF DESCRIPTION OF THE DRAWINGS

FIG. 7 is a table illustrating actions required for certain access permission conditions in accordance with one example embodiment.

DESCRIPTION

Whilst the technique of example embodiments may be applied in any data processing apparatus where a multi-stage address translation process is required to produce a physical address in memory from a virtual address specified in an access request, for the purposes of discussing an example particular embodiment a data processing apparatus employing a virtualisation environment will be considered.

Figure 1:
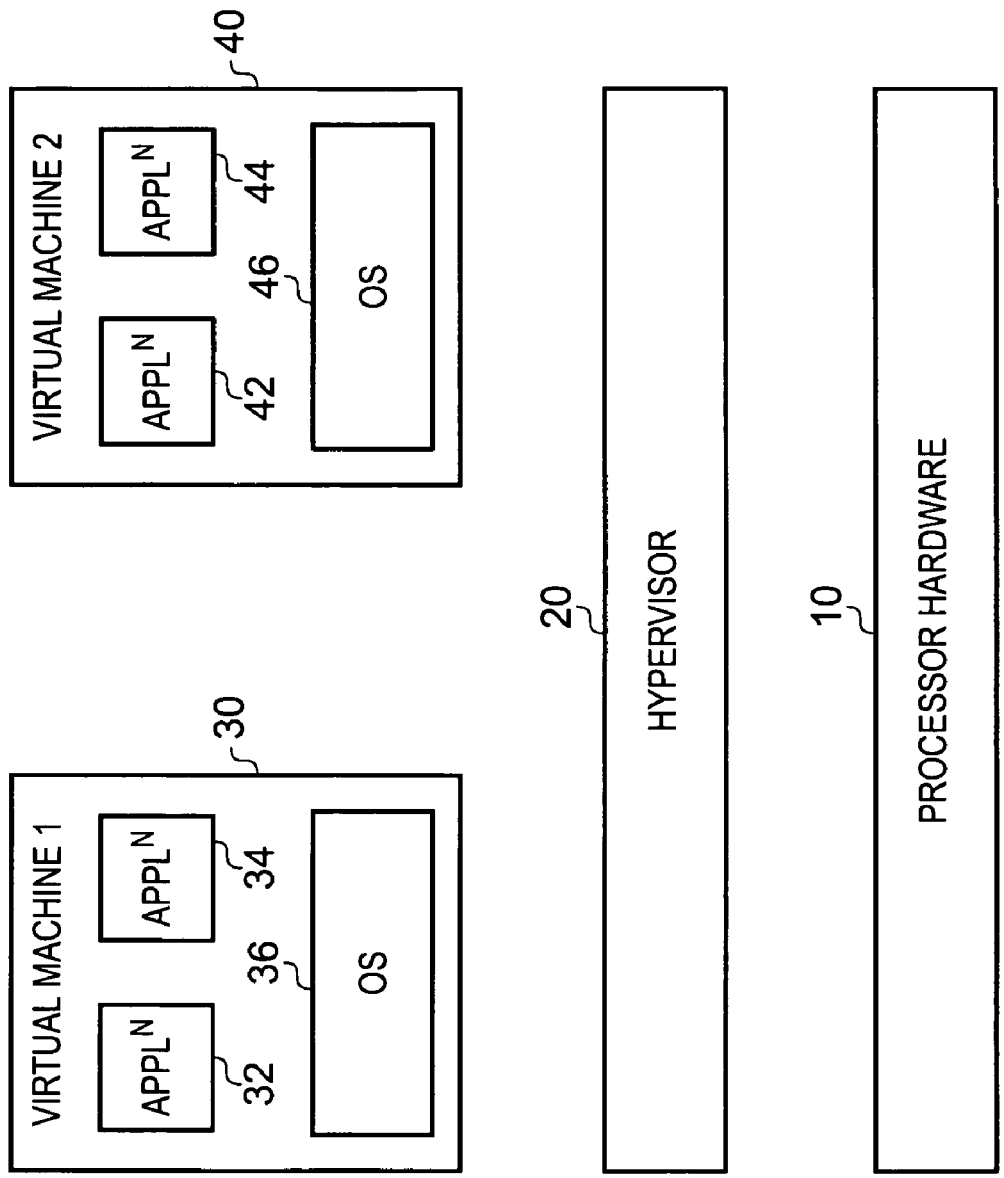
FIG. 1 is a diagram schematically illustrating a virtualisation environment in which example embodiments may be employed.

FIG. 1 is a diagram schematically illustrating a virtualisation environment in which example embodiments may be employed. The processor hardware 10, such as a processor core, is arranged to execute hypervisor software 20 in order to support the execution of multiple virtual machines 30, 40 on the processor hardware. Although in FIG. 1 only two virtual machines 30, 40 are shown, it will be appreciated that more than two virtual machines may be provided for execution on the same processor hardware 10.

Each virtual machine 30, 40 has one or more applications 32, 34, 42, 44 running on a particular operating system 36, 46. Via the hypervisor software 20, each virtual machine 30, 40 is provided with a particular view of the system in which it resides, and hence for example gets a particular view of the available hardware resources of the system. Each of the virtual machines 30, 40 typically operates independently of any of the other virtual machines executing on the processor hardware 10, and indeed is not necessarily aware of the presence of the other virtual machines.

Figure 2:
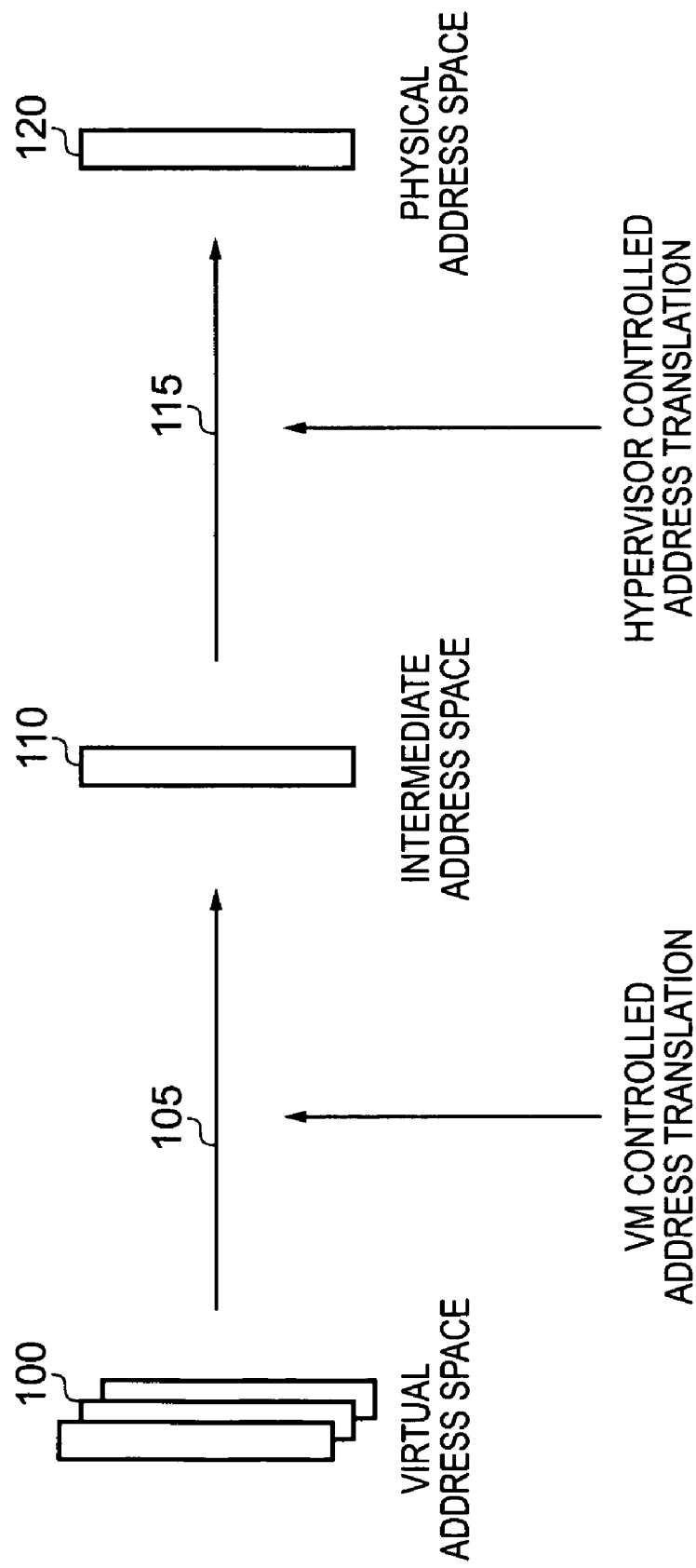
FIG. 2 illustrates a two-stage address translation process in accordance with an example embodiment.

FIG. 2 schematically illustrates the address translation performed for an access request issued by a virtual machine executing on the processor hardware 10, in accordance with one example embodiment. As shown in FIG. 2, one or more virtual address spaces 100 may be established by the virtual machine, and for example separate virtual address spaces may be provided for each application executed by that virtual machine. With reference to the relevant first stage page table for a particular virtual address space, memory management unit (MMU) circuitry is able to perform an address translation from the virtual address space 100 to the intermediate address space 110 (as shown by line 105), this address translation being in effect controlled by the virtual machine through the virtual machine's management of the first stage page tables.

Thereafter, the MMU references a second stage page table controlled by the hypervisor in order to perform an intermediate address to physical address translation, as shown by line 115. Since the second stage page table is managed by the hypervisor it is not possible for the virtual machine to alter the second stage of address translation, and hence the physical address space 120 addressable by the virtual machine can be effectively controlled by the hypervisor through the hypervisor's management of the second stage page table.

Figure 3:
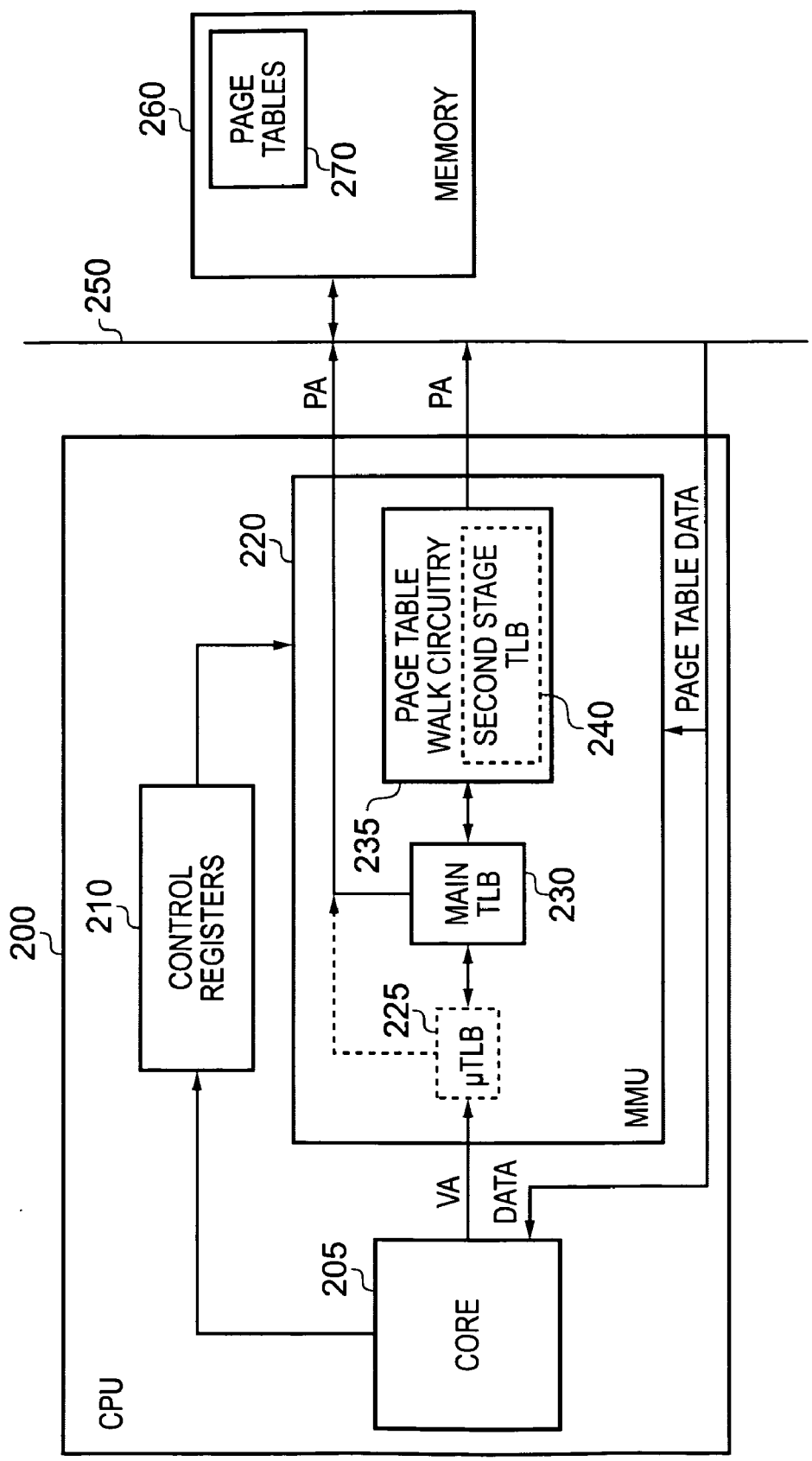
FIG. 3 is a block diagram of a data processing apparatus in accordance with one example embodiment.

FIG. 3 is a block diagram of a data processing apparatus in accordance with one example embodiment. A central processing unit (CPU) 200 includes a processor core 205 that executes hypervisor software to support the execution of multiple virtual machines on the processor core 205.

The processor core 205 is coupled to a system bus 250 via the MMU 220 which is arranged to manage access requests issued by the processor core 205 for access to locations within the memory system 260 of the data processing apparatus. Accordingly, any access request issued by the core 205 and specifying a virtual address will be passed to the MMU 220, with the MMU being responsible for performing predetermined access control functions, more particularly for determining the physical address corresponding to that virtual address, and for resolving access permissions rights and determining region attributes. To enable the MMU 230 to perform these functions, the MMU can access one or more page tables 270 provided within the memory system 260.

As is apparent from the earlier discussion of FIG. 2, the page tables 270 will include one or more first stage page tables and one or more second stage page tables. A page table contains a plurality of descriptors, with each descriptor providing, for a particular region of memory, address mapping information, access permission rights, region attributes, an indication of the size of the associated memory region, and any other required information. The access permission rights will specify whether the associated memory region is read only, write only, read/write or no access, whilst the region attributes will identify whether any access to that region is cacheable, bufferable, etc. The address mapping information will identify how to convert an incoming address to form an output address. It should also be noted that page tables may be formed as multi-level structures, and accordingly whilst a top level page table may directly provide descriptors for one or more regions of memory, it can also include pointers to other page tables, so that for certain memory regions, access to the top level page table then points to one or more further page tables, with a final page table then providing the relevant descriptor for the memory region of interest.

Hence, a top level page table may consist of a fixed number of descriptors of a fixed size describing a fixed sized area of memory. Considering a specific example of a two-stage page table format, there may be 4096 4 byte descriptors each describing a 1 Mb memory area, so the top level page table would be 16 k in size. Each descriptor can either directly map a 1 Mb area (a section entry), or can contain a pointer to a further page table. These further page tables may, for example, contain 256 entries each describing 4 k of memory.

In an alternative page table format more levels can be involved, so for a 32-bit address space a top-level page table could for example be provided with 4 8 byte descriptors, each describing 1 Gb of memory. So each descriptor either maps 1 Gb of memory directly (which is very unlikely) or points to a second level page table. A second level page table contains 512 8 byte entries (4 k total), each describing 2 Mb of memory—so each descriptor either directly maps a 2 Mb area or contains a further pointer to a third level table, containing 512 8 byte entries (4 k total), each describing 4 k.

So at each level there are two options—a descriptor either maps a single area of memory directly (the size of which is determined by the level), or facilitates a further subdivision described by a pointer to a next level page table.

Whilst the technique of example embodiments may be applied to any multi-stage address translation process, in one embodiment the address translation performed by the MMU 220 with reference to the page tables 270 is a two stage process such as that shown in FIG. 2, in which a virtual address is first translated to an intermediate address dependent on the address mapping provided within the relevant descriptor of a first stage page table (or sequence of first stage page tables in the event of a multi-level page table structure as discussed above), and the intermediate address is then translated to a physical address dependent on the address mapping provided within the relevant descriptor of a second stage page table (or sequence of second stage page tables for the example of a multi-level page table structure).

As shown in FIG. 3, the MMU 220 contains a main TLB 230 in which information retrieved from the page tables 270 by the MMU 220 can be stored locally to improve the MMU performance when processing access requests. Page table walk circuitry 235 is used to populate the entries of the main TLB, and as will be discussed in more detail below, seeks wherever possible to produce with reference to the relevant descriptors in the first stage page table(s) and the second stage page table(s) a consolidated entry within the main TLB which enables a direct translation from the virtual to physical address for any virtual address specified by an access request issued by the core 205, and falling within the address range associated with that TLB entry.

As will be appreciated by those skilled in the art, a micro-TLB 225 can also be provided for caching a subset of the information stored in the main TLB 230, this further improving the performance of the MMU 230.

Accordingly, when an access request is issued by the processor core 205, a lookup will be performed in the micro-TLB 225 based on the virtual address, and if a hit is detected in the micro-TLB, then the MMU 220 will perform its predetermined access control functions using the information in that micro-TLB entry. Assuming the MMU determines that the access can proceed, this will typically result in a physical address being output from the micro-TLB onto the bus 250 to cause the addressed data to be accessed in the memory system 260.

In the event of a miss in the micro-TLB 225, or if no micro-TLB is provided, a lookup will be performed in the main TLB 230, and again if a hit is detected the MMU will then perform the predetermined access control functions based on the information provided within the relevant TLB entry. Again, assuming the MMU determines that the access can proceed, this will typically result in a physical address being output onto the bus 250 to cause the data the subject of the access request to be accessed in the memory system 260.

In the event of a miss in the main TLB, the page table walk circuitry 235 will be arranged to access the relevant page tables 270 in the memory system 260 in order to determine the required descriptor information to enable the access request to be processed. Assuming it is determined that the access can proceed, a physical address will then be output onto the bus 250 to cause the data the subject of the access request to be accessed. In addition, the page table walk circuitry 235 will typically populate an entry in the main TLB with the descriptor information obtained as a result of the page table walk process, evicting an existing entry in the main TLB as necessary to make room for the new entry.

As shown in FIG. 3, the page table walk circuitry 235 can optionally include a second stage TLB 240, which is a smaller TLB used to cache only the second stage descriptor information. This can be useful since in many cases the descriptor from the second stage page table will relate to a larger memory region than that associated with the descriptor in the first stage page table, and accordingly a single larger second stage descriptor may underlie many smaller first stage descriptors. Thus by caching the descriptor information related to the second stage of the address translation, this can allow faster resolving of virtual address to physical address mappings since the penalty of having to perform a second stage page table walk can be avoided in many situations. In one embodiment, such a second stage TLB 240 is included, and can reduce the time penalty involved when processing certain "problem cases" as will be discussed in more detail below.

The operation of the components within the CPU 200 is controlled by a number of control registers 210. One or more of the control registers will specify page table pointers which are used by the MMU 220 to determine which page tables 270 within the memory 260 should be referenced when handling access requests issued by the processor core 205. Given that in example embodiments both a first stage page table and a second stage page table are referenced by the MMU when handling the virtual address to physical address translation process, the page table pointers will include a page table pointer to a first stage page table and a separate page table pointer to a second stage page table. The actual page table pointers will depend upon the virtual machine currently being executed by the processor core 205.

In one embodiment, the first stage page tables can be managed by each virtual machine, and indeed any particular virtual machine can establish separate first stage page tables for the different applications running on that virtual machine. Hence, the first stage page table pointer provided within the control registers 210 will be set by the processor core 205 dependent on the virtual machine currently running, and potentially dependent on the particular application running within that virtual machine.

In contrast, the second stage page table is managed by the hypervisor software 20. The hypervisor software may provide a separate second stage page table for each virtual machine, and hence the actual second stage page table pointer provided within the control registers 210 will be set by the hypervisor software running on the processor core 205, dependent on the currently executing virtual machine.

It will be appreciated by those skilled in the art that a typical data processing apparatus will often include additional components over and above those shown in FIG. 3, which may also interact with the MMU 220. For example, the CPU 200 may have a cache associated therewith, either at least partly in parallel with the MMU, or located between the MMU and the bus 250, and that cache may require the physical address produced by the MMU to perform at least part of its internal lookup operations.

Figure 4:
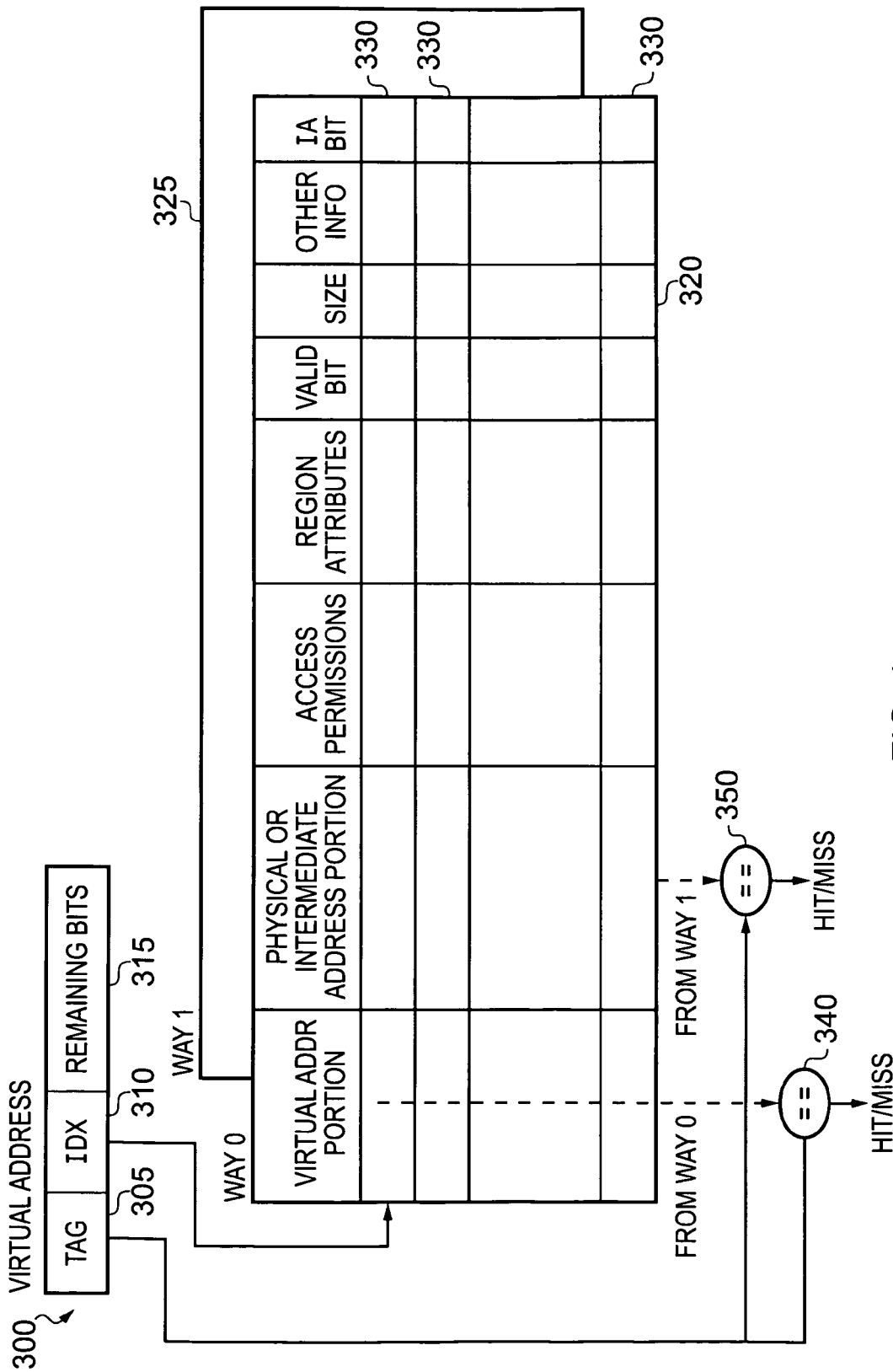
FIG. 4 schematically illustrates a TLB structure in accordance with one example embodiment.

FIG. 4 schematically illustrates the fields provided within each entry of a main TLB 230 in accordance with one example embodiment, in this particular example the main TLB being considered to be a two way set associative TLB structure. Accordingly, each of the ways 320, 325 will include a number of entries 330, each entry being populated with a number of fields. In particular, each entry 330 will specify a virtual address portion, this in effect establishing a virtual address range for which the entry applies. Associated with the virtual address portion will be either a physical address portion or an intermediate address portion. For most entries, it is envisaged that a consolidated address translation can be performed using the entry, and accordingly a physical address portion will be identified based on a combination of the virtual to intermediate address translation information from a first stage page table descriptor and the intermediate to physical address translation information from a second stage page table descriptor. However, as will be discussed in more detail below, in some instances only partial address translation information is stored in the entry, and in this instance an intermediate address portion will be identified instead of a physical address portion.

As also shown, each entry 300 will also include access permission information and region attribute information. For consolidated entries, these fields may include the information obtained from both the first stage page table descriptor and the second stage page table descriptor. Alternatively, it may be necessary only to store information obtained from the first stage page table. For example, considering access permission information, in one embodiment consolidated entries will only be used if the second stage access permissions are at least as permissive as the first stage access permissions, and accordingly for consolidated entries only the first stage access permissions need be retained in the consolidated TLB entry.

For entries containing only partial address translation information, then in one embodiment the access permissions and region attributes stored in the entry will be those corresponding to the first stage page table descriptor. However, as will be discussed in more detail below, in some embodiments it will be beneficial for those fields to also include the access permission and region attribute information from the relevant second stage page table descriptor, since this will avoid the need to perform a page table walk in respect of the second stage page table in certain situations.

Each entry also has a valid bit identifying whether the entry stores valid information that can be used by the MMU. It will be appreciated that a hit can only be detected in an entry of the main TLB if that entry is indicated to be valid.

Each entry 330 will also include a size field identifying the size of the memory region to which the entry relates. In one particular example, this may hence identify whether the entry relates to a 4 Kb page or a 2 Mb section. Various other information may also be included within the entry 330, for example any other control information provided within the page table descriptors.

In accordance with example embodiments, each entry is also provided with an intermediate address bit, this bit being clear if the entry is a consolidated entry enabling a direct virtual to physical address translation to be performed, but being set if the corresponding entry only stores partial address translation information, and accordingly only allows the virtual to intermediate address translation to be performed with respect to the entry's contents. The manner in which the various entries of the TLB are populated, and in particular the manner in which a decision is taken as to whether to store a consolidated entry allowing a direct virtual to physical address translation, or a partial entry enabling only the virtual to intermediate address translation to be determined, will be described in more detail later with reference to the flow diagram of FIG. 5.

As shown in FIG. 4, when a virtual address 300 specified by an access request is received by the MMU 220, an index portion 310 of the virtual address 300 is used to identify one entry in each of the ways of the TLB. The virtual address portion for that identified entry is then output to a comparator 340, 350, where that virtual address information is compared with the tag portion 305 of the virtual address 300. If the virtual address portion in one of the two identified entries matches the tag portion, then a hit condition is detected, and the MMU uses that entry's information in order to perform the address translation. For a consolidated entry, this will enable the MMU to determine with reference to the access permissions and region attributes whether the access can proceed, and if so will enable the physical address to be determined. For an entry containing partial address translation information, then the MMU will be able to analyse the access permissions and region attributes for at least the first stage of the address translation, and will also enable the MMU to determine the relevant intermediate address. The page table walk circuitry 235 can then be used to perform the page table walk in respect of the second stage page table in order to complete the address translation process. In one embodiment, the access permission and region attribute information for the second stage page table is also stored within an entry of the main TLB if partial address translation information is maintained in that entry, to enable the MMU to fully analyse whether the access can proceed before incurring the cost of a second stage page table walk.

If a hit is not detected by either the comparator 340 or the comparator 350, then a main TLB miss is detected, and the page table walk circuitry 235 is employed in the standard manner to perform an access to the relevant first stage page table and second stage page table.

Figure 5:
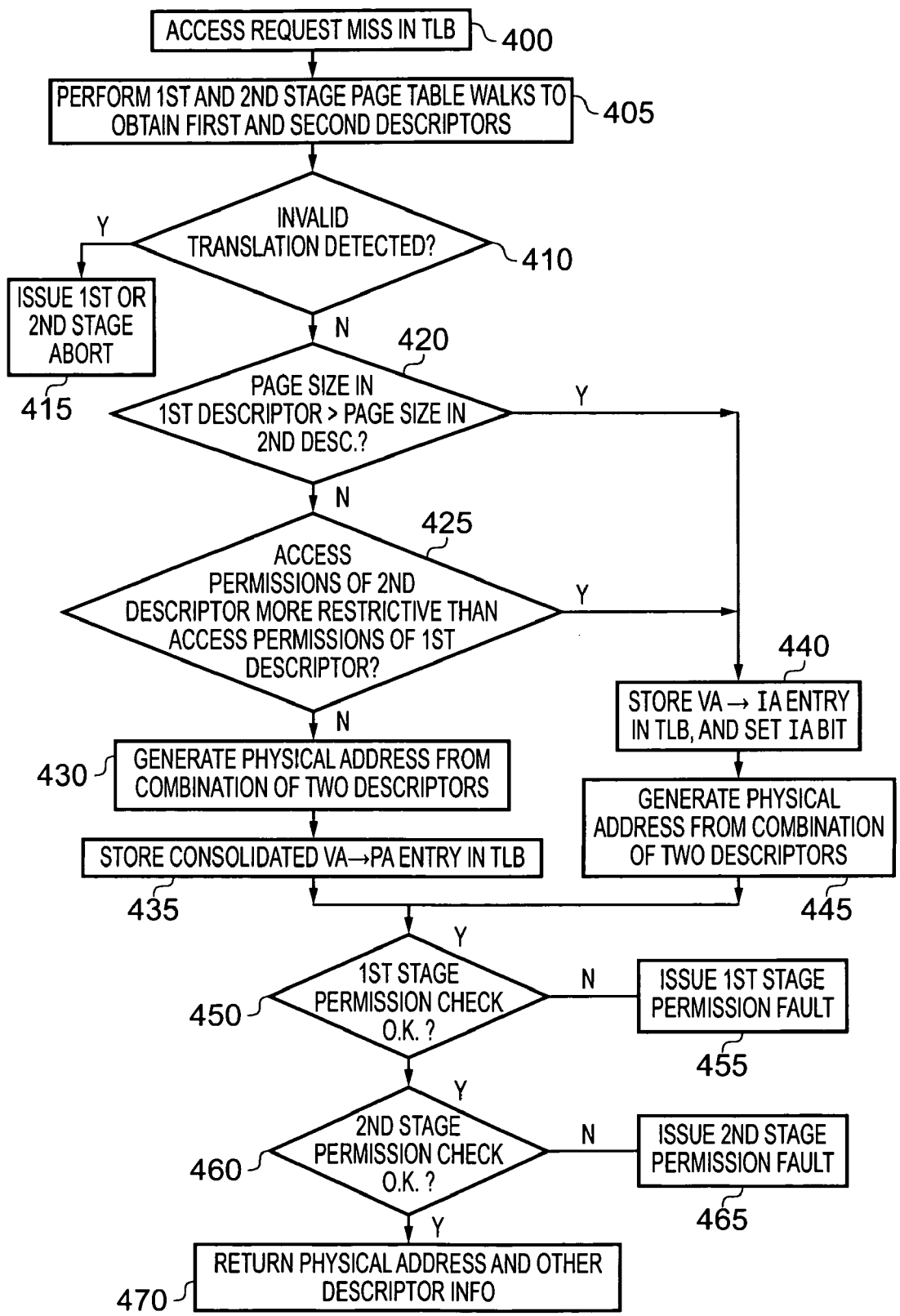
FIG. 5 is a flow diagram illustrating the operations performed upon detection of a miss in the TLB structure in accordance with one example embodiment.

FIG. 5 is a flow diagram illustrating the steps performed by the MMU 220 in one example embodiment on the occurrence of a miss in the main TLB 230. Following detection of a miss at step 400, then at step 405 both first and second stage page table walks are performed by the page table walk circuitry 235 in order to obtain the first and second descriptors required to process the access request. Then, at step 410 it is determined whether an invalid translation has been detected, which may occur for example if there is not a valid descriptor provided in either the first stage page table or the second stage page table for the address specified by the access request. Upon detection of an invalid translation, then a first stage abort or a second stage abort is issued at step 415, as appropriate, the abort typically causing an exception to be taken by the processor core 205.

Assuming no invalid translation is detected, then at step 420 a check is performed for a first problem case. In particular, it is checked whether the page size in the first descriptor is greater than the page size in the second descriptor. If so, this indicates one problem case where the use of a consolidated entry in the main TLB could give rise to complications. Assuming this first problem case does not exist, then at step 425, a check is performed for a second problem case. In particular, it is determined whether the access permissions provided by the second descriptor are more restrictive than the access permissions provided by the first descriptor. Again, if this condition exists, this can give rise to complications if a single consolidated entry is made in the main TLB.

If either of these problem cases is detected, then the process branches to step 440, where an entry in the main TLB is identified and the virtual address to intermediate address translation is stored in that TLB entry, with the associated intermediate address bit being set. The remaining fields of the entry will also be populated, and as discussed earlier in one embodiment the access permissions and region attributes from both the first descriptor and the second descriptor will be stored within the entry. Thereafter, at step 445, the required physical address is generated from a combination of the address translation information in both the first and second descriptors.

If neither of the two above-mentioned problem cases are detected at steps 420 and 425, then the process proceeds to step 430 where the physical address is generated from the combination of the first and second descriptors, and then at step 435 a consolidated entry is made within the main TLB, directly storing the virtual address to physical address translation, with the associated intermediate address bit being clear.

Following either steps 435 or 445, the process proceeds to step 450, where it is determined whether the first stage permission check indicates that the access can proceed. If not, a first stage permission fault is issued at step 455. Assuming it is determined from the first stage permission check that the access can proceed, then at step 460 a second stage permission check is performed, and if the second stage permission check indicates the access cannot proceed, then a second stage permission fault is issued at step 465. In one embodiment permission faults are treated as a special case of aborts. For an abort, the appropriate abort exception is invoked, and a fault status register is populated with data indicating whether the abort was caused by a translation fault, a permission fault, etc.

Assuming both the first stage permission check and second stage permission check are passed, then the process proceeds to step 470 where the physical address, and other descriptor information if required, is returned. The descriptor information may for example be required if the recipient of the physical address is a cache that is physically tagged. Whilst in FIG. 5, the described steps are shown as occurring sequentially, it will be appreciated that some steps can in practice be performed in parallel, for example the access permission checks 450 and 460 can occur in parallel with the TLB entry population steps 435, 440.

Figure 6:
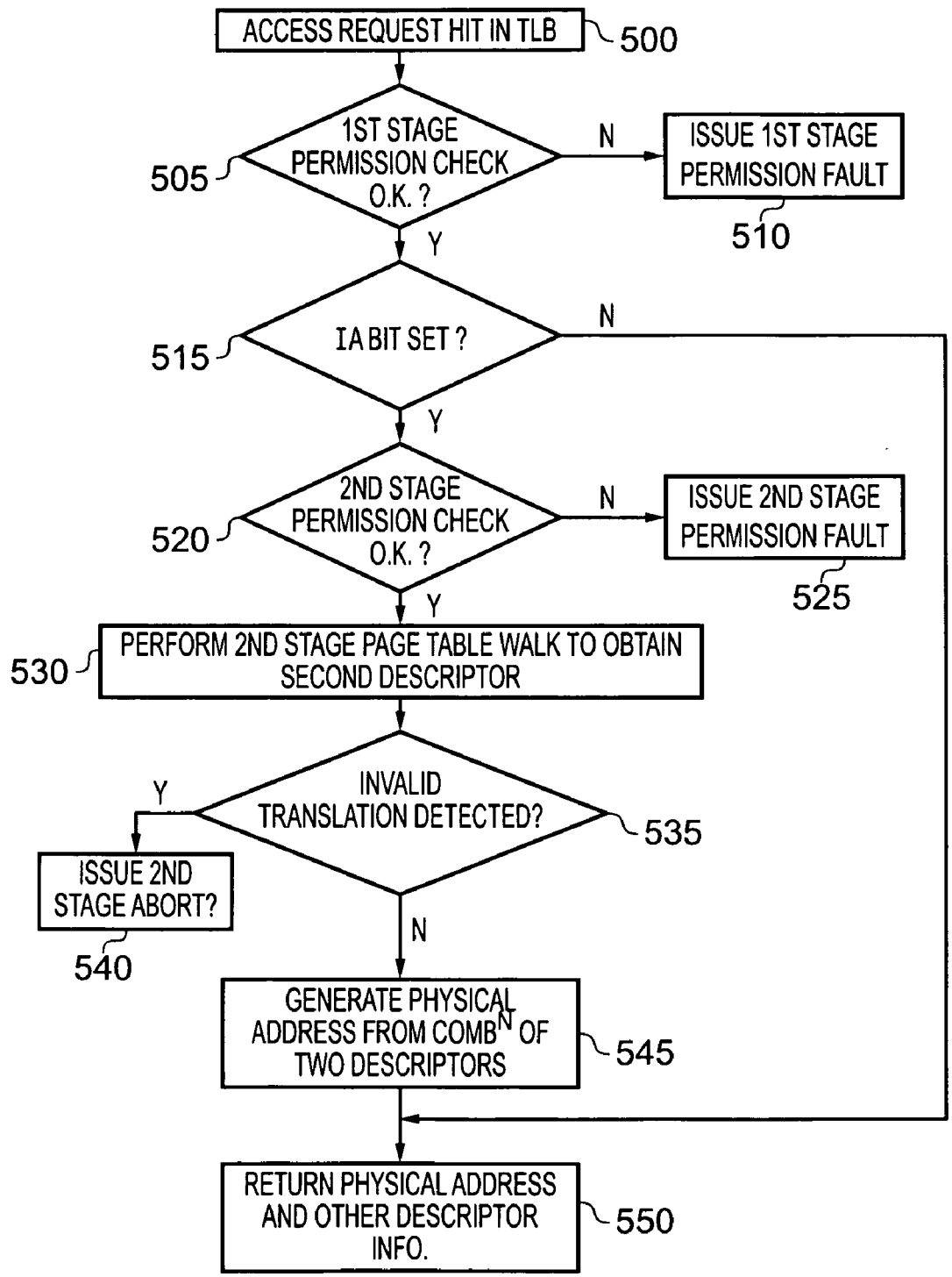
FIG. 6 is a flow diagram illustrating the steps performed on detection of a hit in the TLB structure in accordance with one example embodiment.

FIG. 6 illustrates the steps performed by the MMU 220 in the event of a hit in the main TLB 230 when processing an access request. Following the detection of the hit at step 500, a first stage permission check is performed at step 505 with reference to the access permission information stored in the relevant entry of the TLB. If the first stage permission check fails, then a first stage permission fault is issued at step 510. Assuming there is no first stage permission fault, then the process proceeds to step 515, where it is determined whether the intermediate address bit is set. If not, this indicates that the entry contains consolidated address translation information, and accordingly the process proceeds directly to step 550 where the physical address is determined from the entry and output along with the other descriptor information (if required). It should be noted that since the first stage permission check was passed and it was determined that the intermediate address bit was not set, this indicates that there is no need to check the second stage permissions since if the second stage permissions had been more restrictive than the first stage permissions, only partial address translation information would have been stored in the entry and the intermediate address bit would have been set.

If the intermediate address bit is set, then at step 520 a second stage permission check is performed with reference to the second stage access permission information held in the entry of the main TLB. If the second stage permission check indicates that the access is not allowed, then a second stage permission fault is issued at step 525. At this point, the intermediate address stored in the entry can be output with the second stage permission fault to enable correct handling of the fault. In particular, the fault can be reported to the hypervisor along with the intermediate address.

However, assuming the second stage permission check is passed, then the page table walk circuitry 235 is used to perform a second stage page table walk to obtain the relevant second descriptor. If the second stage TLB 240 is provided in association with the page table walk circuitry 235, a lookup will be performed in that additional TLB to check whether the second descriptor information is cached therein, and only if not will an actual page table walk to memory be performed. It will be noted that if the second stage permission information is not stored within the entry of the TLB, then step 530 would need to be performed before steps 520, 525. However, as will be discussed in more detail with reference to FIG. 7 later, it has been found that by storing the second stage access permission information within the entry of the main TLB, this can significantly reduce the number of times that a second stage page table walk is actually required for entries containing partial address translation information.

Following the second stage page table walk at step 530, it is determined at step 535 whether an invalid translation has been detected, i.e. there is no valid second descriptor for the intermediate address specified in the TLB entry. In the event of such an invalid translation being detected, a second stage abort is issued at step 540. However, assuming the translation is not detected as being invalid, then at step 545 a physical address is generated from the combination of the two descriptors, i.e. from the information stored in the TLB entry and from the intermediate to physical address translation information obtained from the second descriptor. Thereafter, the process proceeds to step 550 where the physical address is output in order to access the required data in memory.

Whilst in FIGS. 5 and 6, the fault checking steps have been indicated by a single decision box, it will be appreciated that the fault checking process may in practice involve several steps. However, this detail is omitted from FIGS. 5 and 6 to improve clarity.

FIG. 7 is a table illustrating potential outcomes for different combinations of access permissions in both the first stage descriptor and the second stage descriptor. The boxes flagged as "OK" indicate those situations where the second stage access permissions are at least as permissive as the first stage access permissions, thereby meaning that it is not possible for a second stage permission fault to occur if a first stage permission fault does not occur. Hence, for these combinations, the "second stage permission" problem cannot arise, and accordingly assuming the "larger page on top of small page" problem is also not present, consolidated entries can be made in the TLB.

The boxes marked with a "X" or "?" indicate those situations where a second stage access permission fault can arise, since the second stage access permissions are less permissive (at least for certain types of accesses) than the first stage access permissions. It should be noted that in the present application, the second stage access permissions are deemed to be more restrictive than the first stage access permissions if for any particular type of access, i.e. read or write, those access permissions are more restrictive. Hence, by way of example, if the access permission from the first stage descriptor identifies that only read accesses can be performed, and the access permission from the second stage descriptor indicates that only write accesses can be performed, then the second stage access permissions are considered to be more restrictive, since they are more restrictive for read accesses (even though they are actually more permissive for write accesses).

In each box marked with "X" or a "?", an indication of the stage at which an access permission fault will be detected for a read or a write operation is identified. Hence, by way of example, considering the situation where the first stage descriptor indicates the accesses are read only, and the second stage descriptor indicates no access, then it will be clear that a read operation will give rise to a second stage permission fault, whilst a write operation will give rise to a first stage permission fault. Either way, there will be no need to perform a second stage page table walk in such situations, provided that the second stage access permission information is available in the TLB entry. The same applies to all of the other boxes marked with an "X". This is the reason why in one example embodiment, for any entries storing only partial address translation information, the access permission rights for both descriptors are included within the entry, thereby allowing the second stage permission check of step 520 of FIG. 6 to be performed without the need to perform a second stage page table walk.

It should be noted that it is only for the two boxes marked with a "?" that there will ever be a need to perform a second stage page table walk. In particular, if the first stage descriptor identifies that read or write accesses can be performed, and the second stage descriptor indicates the allowed accesses as either read only or write only, then it will be necessary to perform a second stage page table walk for a read access or a write access, respectively.

If a micro-TLB 225 is used in association with a main TLB 230 arranged as described in the above embodiments, then care has to be taken as to how the micro-TLB is used. In one embodiment, whenever any entry in the main TLB is invalidated, all address translation information in the entire micro-TLB is invalidated. There are a number of ways in which the entries of the micro-TLB can then be arranged, for reasons which will be discussed in more detail below.

In cases where the main TLB has stored a partial translation due to a "larger page on top of small page" situation, a consolidated virtual address to physical address translation of the smaller size can be stored in an entry of the micro-TLB, relying on the "invalidate entire micro-TLB on any invalidate" behaviour to handle invalidate operations correctly.

In cases where there is a possible permission issue, but not a definite one (i.e. the "?" cases in FIG. 7), it is desirable to achieve optimal performance when a "permitted" operation is being performed. For example, if the first stage descriptor identifies that read or write accesses can be performed, and the second stage descriptor indicates the allowed accesses are read only, it would be desirable from a performance point of view to be able to perform a series of reads and have them hit in the micro-TLB, implying that the micro-TLB should store a consolidated translation along with both sets of permission bits. If the non-allowed operation is attempted (a write in the example case), then it can be arranged to effectively miss in the micro-TLB (based on the permission bits indicating a non-allowed access), whereafter the intermediate address required for handling of the permission fault can be retrieved from the main TLB. Given that these cases are going to cause a fault entry sequence to take place anyway, the fact that a main TLB lookup is required to retrieve the intermediate address is not a significant concern (main TLB lookups should only take a few cycles versus the tens of cycles consumed by a fault sequence).

If the above approach is taken, this implies that where there is any second stage permission issue (the "X" squares on FIG. 7) a main TLB lookup will have to be performed. However, in some of the cases (4 out of the 5 X squares), only the virtual address and permission information is needed for the 1st stage fault cases, so it could be useful to store such entries in the micro-TLB anyway. However, since in no "X" cases will the physical address ever be needed (since there will always be an access permission fault), there is the option of storing the intermediate address in the otherwise "spare" physical address bits in the micro-TLB entry and saving some time. However, as mentioned earlier, since a fault entry sequence is going to be invoked anyway, the performance cost of a main TLB lookup is not significant.

Finally, it is always possible for the micro-TLB to store both the intermediate address and physical address for each entry. This is not as wasteful as it would be for the main TLB since the micro-TLB typically has fewer entries, but it is still a bit of a waste for the common case where the entries are "well behaved".

Hence, in summary, the following four embodiments may be considered for the micro-TLB entries:

a) The micro-TLB only stores consolidated entries. For the "OK" and "?" cases of FIG. 7, the micro-TLB stores the consolidated virtual address to physical address translation information, along with the permission bits for both descriptors. For size mismatch cases it stores the smaller page size always. It never stores intermediate addresses, so if these are needed then they will have to be retrieved from the main TLB (since this only occurs in fault cases, the overhead is less of an issue). For the "X" cases of FIG. 7 (always a permission fault of some kind) the micro-TLB does not store anything.

b) As per (a), but in the "X" cases where a 1st stage fault can occur, both sets of permission bits are stored to allow these faults to be generated directly by the micro-TLB (although a main TLB lookup will still be needed for 2nd stage fault cases in order to obtain the required intermediate address).

c) The micro-TLB stores consolidated entries for any case where an access might be allowed to complete. For cases where there will always be a fault (the "X" cases) the physical address will never be needed, and so partial address translation information (virtual address to intermediate address) entries are stored in the micro-TLB. This allows all information needed for such faults to be provided by the micro-TLB. For the "?" cases, a main TLB lookup will only be needed in cases where the non-permitted operation is performed.

d) The micro-TLB always stores intermediate address and physical address for each translation. This takes up more space but allows the micro-TLB to provide all needed information in all cases.

Of these embodiments option (a) is likely to be the simplest to implement, and the required extra logic for the other options may be considered not worthwhile. For example, in many embodiments micro-TLBs may well be flushed when switching to the hypervisor, and in such instances you would never see benefit from storing the intermediate address in the micro-TLB for second stage fault cases (as per options (c) and (d)).

From the above description of non-limiting, example embodiments, it will be appreciated that such embodiments provide a very efficient mechanism for handling address translation in situations where a multi-stage address translation process is used. In particular, by arranging the TLB in the manner described in the above embodiments, to allow both consolidated address translation entries and partial address translation entries, the TLB can be retained at approximately the size of a single consolidated TLB, whilst still enabling efficient handling of certain problem cases that can arise when using consolidated TLB entries, without resorting to low performance exhaustive searches in problem cases, or needing to store the intermediate address for every single entry.

In accordance with non-limiting, example embodiments, an additional bit is added to each TLB entry, with this bit being used to indicate whether the entry is a virtual address to physical address entry (the normal case) or a virtual address to intermediate address entry. When the TLB is accessed to perform virtual address to physical address translation, the virtual address is used to determine which entry to access. If a matching entry is found, the additional bit provided in that entry is checked. If it specifies a virtual address to physical address entry, then the physical address is returned and processed as normal. If the entry indicates a virtual address to intermediate address entry, then the second stage of the address translation (i.e. the intermediate to physical address translation) is performed again, allowing the problem cases to be handled correctly and efficiently. In particular, considering the earlier-mentioned larger page on top of small page problem, the larger (first stage) mapping is kept in the TLB and flagged as a virtual address to intermediate address translation. Since there is then a single entry present in the TLB, any attempt to invalidate that mapping will proceed as expected without additional lookups being required. Further, when a virtual address lying within the large page is accessed, the virtual to intermediate flag will be spotted, and the second stage lookup will be performed to find the physical address.

Further, for the earlier-mentioned second stage permission problem, again only the first stage mapping is kept in the TLB. The second stage page table walk can be repeated as required, and in the event of a permission failure the intermediate address is readily available from the TLB entry. The nature of the problem cases mean that it is straightforward for the hardware to detect such cases at the time the entries in the TLB are populated, and accordingly it can be readily determined whether to form the entry as a consolidated (virtual to physical address) entry, or a partial (virtual address to intermediate address) entry.

Although example embodiments have been described herein, it will be apparent that the claims are not limited thereto, and that many modifications and additions may be made.

We claim:

1. A data processing apparatus comprising:
   processing circuitry for performing data processing operations;
   a memory system for storing data for access by the processing circuitry when performing said data processing operations;
   address translation circuitry, responsive to an access request issued by the processing circuitry and specifying a virtual address, to perform a multi-stage address translation process to produce, via at least one intermediate address, a physical address in said memory system corresponding to the virtual address;
   a translation lookaside buffer (TLB) accessible by the address translation circuitry and having a plurality of entries, each entry storing address translation information for one or more virtual addresses, and each entry having a field which indicates whether the address translation information is consolidated address translation information enabling the address translation circuitry to generate the physical address, or is partial address translation information enabling the address translation circuitry to generate one of said at least one intermediate addresses;
   responsive to the access request issued by the processing circuitry, the address translation circuitry is configured to reference the TLB to determine whether one of said entries provides address translation information for the specified virtual address;
   if said one of said entries provides address translation information for the specified virtual address, and the field indicates that the address translation information is consolidated address translation information, the address translation circuitry is configured to produce the physical address directly from the consolidated address translation information;
   if said one of said entries provides address translation information for the specified virtual address, and the field indicates that the address translation information is partial address translation information, the address translation circuitry is configured to produce said one of said at least one intermediate addresses from the partial address translation information, determine from the field a stage of the multi-stage address translation process that was reached by the address translation circuitry when using the partial address translation information, and then perform the remainder of the multi-stage address translation process; and
   if none of said entries provides address translation information for the specified virtual address, the address translation circuitry is configured to perform all stages of the multi-stage address translation process.

2. A data processing apparatus as claimed in claim 1, further comprising:
   control circuitry for populating an entry in the TLB with address translation information, the control circuitry when producing the address translation information checking if one or more predetermined conditions exist;
   if said one or more predetermined conditions exist, the control circuitry producing said partial address translation information and setting the field to identify the stage of the multi-stage address translation process that will be reached by the address translation circuitry when using the partial address translation information; and
   if said one or more predetermined conditions do not exist, the control circuitry producing said consolidated address translation information and setting the field to indicate that the address translation information is consolidated address translation information.

3. A data processing apparatus as claimed in claim 2, wherein the processing circuitry executes hypervisor software to support the execution of multiple virtual machines on the processing circuitry, at least a final stage of the multi-stage address translation process employing address translation information controlled by the hypervisor software.

4. A data processing apparatus as claimed in claim 2, wherein said control circuitry comprises page table access circuitry for determining the address translation information to be used to populate an entry of the TLB by accessing page tables provided in said memory system, a page table being provided for each stage of the multi-stage address translation process.

5. A data processing apparatus as claimed in claim 4, wherein said page table access circuitry contains an additional TLB for caching address translation information obtained from descriptors provided within at least the page table associated with a final stage of the multi-stage address translation process.

6. A data processing apparatus as claimed in claim 1 wherein for each stage of the multi-stage address translation process a page table is provided in said memory system, each page table containing a number of descriptors, each descriptor containing, for an associated address range, address translation information and access control information for the associated stage.

7. A data processing apparatus as claimed in claim 6, wherein for each entry of the TLB storing partial address translation information, the entry further stores the access control information for each stage of the multi-stage address translation process.

8. A data processing apparatus as claimed in claim 1 wherein the multi-stage address translation process is a two stage process, a first stage causing the specified virtual address to be translated to a corresponding intermediate address, and a second stage causing the corresponding intermediate address to be translated to a corresponding physical address.

9. A data processing apparatus as claimed in claim 8, wherein:
   if said one of said entries of the TLB stores consolidated address translation information, that consolidated address translation information allows the address generation circuitry to directly generate the corresponding physical address from the specified virtual address; and
   if said one of said entries of the TLB stores partial address translation information, that partial address translation information allows the address generation circuitry to generate the corresponding intermediate address from the specified virtual address.

10. A data processing apparatus as claimed in claim 9, wherein
   for both stages of the two-stage address translation process a page table is provided in said memory system, each page table containing a number of descriptors;
   within a first page table each descriptor contains, for an associated virtual address range, address translation information and access control information for the first stage;
   within a second page table each descriptor contains, for an associated intermediate address range, address translation information and access control information for the second stage; and
   if said one of the entries of the TLB stores partial address translation information, the address translation circuitry uses the partial address translation information to generate the corresponding intermediate address from the specified virtual address, and then references the second page table to complete the two-stage address translation process.

11. A data processing apparatus as claimed in claim 1, further comprising a micro-TLB for storing address translation information used by the address translation circuitry for a number of previous access requests, and the address translation circuitry being arranged on receipt of said access request to only reference the TLB if the required address translation information is not present in the micro-TLB.

12. A data processing apparatus as claimed in claim 11, wherein the micro-TLB is arranged to store only consolidated address translation information.

13. A data processing apparatus comprising:
   processing circuitry for performing data processing operations;
   a memory system for storing data for access by the processing circuitry when performing said data processing operations;
   address translation circuitry, responsive to an access request issued by the processing circuitry and specifying a virtual address, to perform a multi-stage address translation process to produce, via at least one intermediate address, a physical address in said memory system corresponding to the virtual address;
   a storage unit accessible by the address translation circuitry and having a plurality of entries, each entry storing address translation information for one or more virtual addresses, and each entry having a field which indicates whether the address translation information is consolidated address translation information enabling the address translation circuitry to generate the physical address, or is partial address translation information enabling the address translation circuitry to generate one of said at least one intermediate addresses;
   responsive to the access request issued by the processing circuitry, the address translation circuitry is configured to reference the storage unit to determine whether one of said entries provides address translation information for the specified virtual address;
   if said one of said entries provides address translation information for the specified virtual address, and the field indicates that the address translation information is consolidated address translation information, the address translation circuitry is configured to produce the physical address directly from the consolidated address translation information;
   if said one of said entries provides address translation information for the specified virtual address, and the field indicates that the address translation information is partial address translation information, the address translation circuitry is configured to produce said one of said at least one intermediate addresses from the partial address translation information, determine from the field a stage of the multi-stage address translation process that was reached by the address translation circuitry when using the partial address translation information, and then perform the remainder of the multi-stage address translation process;
   if none of said entries provides address translation information for the specified virtual address, the address translation circuitry is configured to perform all stages of the multi-stage address translation process;
   control circuitry for populating an entry in the storage unit with address translation information, the control circuitry, when producing the address translation information, is configured to check if one or more predetermined conditions exist;
   if said one or more predetermined conditions exist, the control circuitry is configured to produce said partial address translation information and setting the field to identify the stage of the multi-stage address translation process that will be reached by the address translation circuitry when using the partial address translation information; and
   if said one or more predetermined conditions do not exist, the control circuitry is configured to produce said consolidated address translation information and setting the field to indicate that the address translation information is consolidated address translation information;
   wherein for each stage of the multi-stage address translation process a page table is provided in said memory system, each page table containing a number of descriptors, each descriptor containing, for an associated address range, address translation information and access control information for the associated stage; and
   wherein one of said one or more predetermined conditions the control circuitry is configured to check is whether an address range associated with the relevant descriptor in the page table for an earlier stage of the multi-stage address translation process is larger than an address range associated with the relevant descriptor in the page table for a later stage of the multi-stage address translation process.

14. A data processing apparatus comprising:

processing circuitry for performing data processing operations;

a memory system for storing data for access by the processing circuitry when performing said data processing operations;

address translation circuitry, responsive to an access request issued by the processing circuitry and specifying a virtual address, to perform a multi-stage address translation process to produce, via at least one intermediate address, a physical address in said memory system corresponding to the virtual address;

a storage unit accessible by the address translation circuitry and having a plurality of entries, each entry storing address translation information for one or more virtual addresses, and each entry having a field which indicates whether the address translation information is consolidated address translation information enabling the address translation circuitry to generate the physical address, or is partial address translation information enabling the address translation circuitry to generate one of said at least one intermediate addresses;

responsive to the access request issued by the processing circuitry, the address translation circuitry configured to reference the storage unit to determine whether one of said entries provides address translation information for the specified virtual address;

if said one of said entries provides address translation information for the specified virtual address, and the field indicates that the address translation information is consolidated address translation information, the address translation circuitry configured to produce the physical address directly from the consolidated address translation information;

if said one of said entries provides address translation information for the specified virtual address, and the field indicates that the address translation information is partial address translation information, the address translation circuitry configured to produce said one of said at least one intermediate addresses from the partial address translation information, determine from the field a stage of the multi-stage address translation process that was reached by the address translation circuitry when using the partial address translation information, and then perform the remainder of the multi-stage address translation process;

if none of said entries provides address translation information for the specified virtual address, the address translation circuitry is configured to perform all stages of the multi-stage address translation process;

control circuitry for populating an entry in the storage unit with address translation information, the control circuitry, when producing the address translation information, configured to check if one or more predetermined conditions exist;

if said one or more predetermined conditions exist, the control circuitry configured to produce said partial address translation information and setting the field to identify the stage of the multi-stage address translation process that will be reached by the address translation circuitry when using the partial address translation information; and if said one or more predetermined conditions do not exist, the control circuitry configured to produce said consolidated address translation information and setting the field to indicate that the address translation information is consolidated address translation information;

wherein for each stage of the multi-stage address translation process a page table is provided in said memory system, each page table containing a number of descriptors, each descriptor containing, for an associated address range, address translation information and access control information for the associated stage; and wherein one of said one or more predetermined conditions the control circuitry is configured to check is whether the access control information associated with the relevant descriptor in the page table for an earlier stage of the multi-stage address translation process is more permissive than the access control information associated with the relevant descriptor in the page table for a later stage of the multi-stage address translation process.

15. A data processing apparatus comprising:

processing circuitry for performing data processing operations;

a memory system for storing data for access by the processing circuitry when performing said data processing operations;

address translation circuitry, responsive to an access request issued by the processing circuitry and specifying a virtual address, to perform a multi-stage address translation process to produce, via at least one intermediate address, a physical address in said memory system corresponding to the virtual address;

a storage unit accessible by the address translation circuitry and having a plurality of entries, each entry storing address translation information for one or more virtual addresses, and each entry having a field which indicates whether the address translation information is consolidated address translation information enabling the address translation circuitry to generate the physical address, or is partial address translation information enabling the address translation circuitry to generate one of said at least one intermediate addresses;

responsive to the access request issued by the processing circuitry, the address translation circuitry referencing the storage unit to determine whether one of said entries provides address translation information for the specified virtual address;

if said one of said entries provides address translation information for the specified virtual address, and the field indicates that the address translation information is consolidated address translation information, the address translation circuitry is configured to produce the physical address directly from the consolidated address translation information;

if said one of said entries provides address translation information for the specified virtual address, and the field indicates that the address translation information is partial address translation information, the address translation circuitry is configured to produce said one of said at least one intermediate addresses from the partial address translation information, determine from the field a stage of the multi-stage address translation process that was reached by the address translation circuitry when using the partial address translation information, and then perform the remainder of the multi-stage address translation process;

if none of said entries provides address translation information for the specified virtual address, the address translation circuitry is configured to perform all stages of the multi-stage address translation process;
wherein the storage unit is a translation lookaside buffer (TLB), and the data processing apparatus further comprises a micro-TLB for storing address translation information used by the address translation circuitry for a number of previous access requests, and the address translation circuitry being arranged on receipt of said access request to only reference the TLB if the required address translation information is not present in the micro-TLB;
wherein whenever any entry in the TLB is invalidated, all address translation information in the entire micro-TLB is invalidated.

16. A data processing apparatus comprising:
processing circuitry for performing data processing operations;
a memory system for storing data for access by the processing circuitry when performing said data processing operations;
address translation circuitry, responsive to an access request issued by the processing circuitry and specifying a virtual address, to perform a multi-stage address translation process to produce, via at least one intermediate address, a physical address in said memory system corresponding to the virtual address;
a storage unit accessible by the address translation circuitry and having a plurality of entries, each entry storing address translation information for one or more virtual addresses, and each entry having a field which indicates whether the address translation information is consolidated address translation information enabling the address translation circuitry to generate the physical address, or is partial address translation information enabling the address translation circuitry to generate one of said at least one intermediate addresses;
responsive to the access request issued by the processing circuitry, the address translation circuitry is configured to reference the storage unit to determine whether one of said entries provides address translation information for the specified virtual address;
if said one of said entries provides address translation information for the specified virtual address, and the field indicates that the address translation information is consolidated address translation information, the address translation circuitry is configured to produce the physical address directly from the consolidated address translation information;
if said one of said entries provides address translation information for the specified virtual address, and the field indicates that the address translation information is partial address translation information, the address translation circuitry is configured to produce said one of said at least one intermediate addresses from the partial address translation information, determine from the field a stage of the multi-stage address translation process that was reached by the address translation circuitry when using the partial address translation information, and then perform the remainder of the multi-stage address translation process;
if none of said entries provides address translation information for the specified virtual address, the address translation circuitry is configured to perform all stages of the multi-stage address translation process;
wherein the storage unit is a translation lookaside buffer (TLB), and the data processing apparatus further comprises a micro-TLB for storing address translation information used by the address translation circuitry for a number of previous access requests, and the address translation circuitry being arranged on receipt of said access request to only reference the TLB if the required address translation information is not present in the micro-TLB;
wherein the micro-TLB is arranged to store both consolidated address translation information and partial address translation information, and for any partial address translation information stored in the micro-TLB, the micro-TLB is also arranged to store access control information associated with each stage of the multi-stage address translation process.

17. A method of handling address translation for access requests issued by processing circuitry in order to access data in a memory system, comprising the steps of:
responsive to an access request issued by the processing circuitry and specifying a virtual address, employing address translation circuitry to perform a multi-stage address translation process to produce, via at least one intermediate address, a physical address in said memory system corresponding to the virtual address;
providing a translation lookaside buffer (TLB) accessible by the address translation circuitry and having a plurality of entries, each entry storing address translation information for one or more virtual addresses, and providing each entry with a field which indicates whether the address translation information is consolidated address translation information enabling the address translation circuitry to generate the physical address, or is partial address translation information enabling the address translation circuitry to generate one of said at least one intermediate addresses;
responsive to the access request issued by the processing circuitry, the address translation circuitry performing the steps of:
referencing the TLB to determine whether one of said entries provides address translation information for the specified virtual address;
if said one of said entries provides address translation information for the specified virtual address, and the field indicates that the address translation information is consolidated address translation information, producing the physical address directly from the consolidated address translation information;
if said one of said entries provides address translation information for the specified virtual address, and the field indicates that the address translation information is partial address translation information, producing said one of said at least one intermediate addresses from the partial address translation information, determining from the field a stage of the multi-stage address translation process that was reached by the address translation circuitry when using the partial address translation information, and then performing the remainder of the multi-stage address translation process; and
if none of said entries provides address translation information for the specified virtual address, performing all stages of the multi-stage address translation process.

18. A data processing apparatus comprising:
processing means for performing data processing operations;
memory means for storing data for access by the processing means when performing said data processing operations;
address translation means, responsive to an access request issued by the processing means and specifying a virtual address, for performing a multi-stage address translation process to produce, via at least one intermediate address, a physical address in said memory means corresponding to the virtual address;

a translation lookaside buffer (TLB) means accessible by the address translation means and having a plurality of entries, each entry for storing address translation information for one or more virtual addresses, and each entry having a field for indicating whether the address translation information is consolidated address translation information enabling the address translation circuitry to generate the physical address, or is partial address translation information enabling the address translation circuitry to generate one of said at least one intermediate addresses;

responsive to the access request issued by the processing means, the address translation means for referencing the TLB means to determine whether one of said entries provides address translation information for the specified virtual address;

if said one of said entries provides address translation information for the specified virtual address, and the field indicates that the address translation information is consolidated address translation information, the address translation means for producing the physical address directly from the consolidated address translation information;

if said one of said entries provides address translation information for the specified virtual address, and the field indicates that the address translation information is partial address translation information, the address translation means for producing said one of said at least one intermediate addresses from the partial address translation information, determining from the field a stage of the multi-stage address translation process that was reached by the address translation means when using the partial address translation information, and then performing the remainder of the multi-stage address translation process; and if none of said entries provides address translation information for the specified virtual address, the address translation means is configured to perform all stages of the multi-stage address translation process.

* * * * *